UNITED STATES PATENT OFFICE 2,373,884

PRODUCTION OF FRESH WATER FROM SALT WATER

Hans Rudolph Frisch, Caterham-on-the-Hill, England

No Drawing. Application June 14, 1944, Serial No. 540,331. In Great Britain June 16, 1943

5 Claims. (Cl. 210—23)

This invention relates to the production of fresh water from salt water, by the precipitation of the soluble salts of sea water by the interaction of the almost insoluble lead fluoride in the presence of aluminium fluoride or ferric fluoride. The molar ratio of lead fluoride to aluminium fluoride or ferric fluoride used according to this invention is approximately 3:1.

Lead fluoride reacts with the magnesium sulphate and calcium sulphate in sea water by precipitating insoluble lead sulphate, magnesium fluoride and calcium fluoride. Sodium chloride is converted into sodium fluoride, which immediately combines with the aluminium fluoride or ferric fluoride present, forming insoluble cryolite or iron cryolite.

The resulting desalted water still contains about 0.3 g. of dissolved lead and fluoride per litre, the removal of which can be effected by subsequent treatment with magnesium phosphate, which precipitates both irons as insoluble lead phosphate and magnesium fluoride.

The elimination of the traces of lead fluorochloride can be performed even in a simpler way, according to this invention, by adding small amounts of sea water about 3% to the treated water.

It is already known that soluble fluorides can be precipitated and determined as lead fluorochloride by the action of lead chloride. This is in fact one of the standard methods for the analytical estimation of fluorine (Starck, Z. angew. Chemie. 1911, vol. 70, p. 173). It has now been found that the reverse reaction, treatment of soluble chlorides with lead fluoride leads practically to an almost complete elimination of chlorine ions.

This reaction was by no means to be expected to go to completion, as lead fluoride itself is only very slightly soluble in water (0.6 g./litre). The solubility of lead fluoride, however, is slightly greater than that of lead fluorochloride (0.3 g./litre), and this small difference is sufficient, in agreement with the law of dynamic equilibrium, given sufficient time to react, to bring the conversion of lead fluoride into lead fluorochloride to completion.

The chemical reactions taking place, when sea water is treated, according to this invention, with a mixture of lead fluoride and aluminium fluoride (or ferric fluoride), are the following:

$$MgSO_4 + PbF_2 = MgF_2 \downarrow + PbSO_4 \downarrow$$
$$CaSO_4 + PbF_2 = CaF_2 \downarrow + PbSO_4 \downarrow$$
$$MgCl_2 + 2PbF_2 = MgF_2 \downarrow 2PbFCl \downarrow$$
$$NaCl + PbF_2 = NaF + PbFCl \downarrow$$
$$3NaF + AlF_3 = Na_3AlF_6 \downarrow$$

When sea water containing 36 gms. of salts per litre is acted upon as described, its salt content decreases after treatment during

| 1 hr. | 8 hr. | 24 hr. to |
|---|---|---|
| 9 gms. | 3 gms. | 0.5 gms. per litre |

The limit of permissibility for the intake of brackish water for human consumption is at a salt concentration of 12 gms. per litre (hypotonic concentration), or 0.7% of chlorine. With the process of this invention this condition is easily achieved, and the especially harmful magnesium salts are completely removed.

The spent lead fluoride can be subsequently re-used for the partial removal of salts of new batches of sea water, decreasing the salt content from 36 g./litre to 30 g./litre.

As previously mentioned, the amount of sea water to be added to the desalted water to remove residual traces of lead and fluorine is about 3%; however appreciably greater quantities of up to 50% can be added without exceeding the hypotonic concentration.

The following examples illustrate how the process of the invention may be carried into effect:

(1) 1 litre of sea water is added to a finely ground mixture of 147 gms. of lead fluoride and 32 gms. of ferric fluoride (FeF₃.4½H₂O) and kept for 24 hours. The thin slurry is filtered into a suspension of magnesium phosphate,

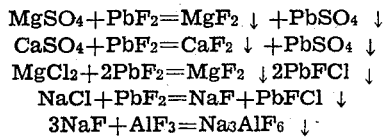

$$(Mg_3(PO_4)_2)$$

and kept for another 24 hours, the filtrate obtained is drinkable water, containing less than 3 gms. of salts per litre.

(2) An empty 40 gallon barrel, such as is used in life boats for carrying fresh water, is filled with sea water (150 litres) and a mixture of 22 kgms. of lead fluoride and 5.25 kgms. of aluminium fluoride (AlF₃.7H₂O) added. The volume of the added chemicals is only 4 litres. After 24 hours the water is filtered through a cotton filter into another empty barrel of the same size, and 5 litres of sea water added. After several hours the water can be filtered through cotton. It is drinkable, containing less than 5 gms. of salts per litre.

This process is especially suitable in emergencies at sea, where distillation of water is difficult. It requires no attention or special apparatus and works at ordinary temperature.

I claim:

1. A process for the production of fresh water from salt water which comprises treating the salt water with lead fluoride and with at least one trivalent metallic fluoride selected from the group consisting of ferric fluoride and aluminium fluoride, the molar ratio of lead fluoride to the trivalent metallic fluoride being approximately 3:1 and the amount of lead fluoride being approximately chemically equivalent to the sodium, calcium and magnesium salts present in the salt water, to produce a precipitate, and separating the fresh water from the precipitate.

2. A process for the production of fresh water from salt water which comprises treating the salt water with lead fluoride and with at least one trivalent metallic fluoride selected from the group consisting of ferric fluoride and aluminium fluoride, the molar ratio of lead fluoride to the trivalent metallic fluoride being approximately 3:1 and the amount of lead fluoride being approximately chemically equivalent to the sodium, calcium and magnesium salts present in the salt water, to produce a precipitate, separating the fresh water from the precipitate and adding magnesium phosphate thereto to remove residual lead and fluorine ions.

3. A process for the production of fresh water from salt water which comprises treating the salt water with lead fluoride and with at least one trivalent metallic fluoride selected from the group consisting of ferric fluoride and aluminium fluoride, the molar ratio of lead fluoride to the trivalent metallic fluoride being approximately 3:1 and the amount of lead fluoride being approximately chemically equivalent to the sodium, calcium and magnesium salts present in the salt wtaer, to produce a precipitate separating the fresh water from the precipitate, and adding sea water to the fresh water obtained to remove residual lead and fluorine ions.

4. A process for the production of fresh water from sea water which comprises mixing 1000 parts by volume of sea water with 147 parts by weight of lead fluoride and 32 parts by weight of ferric fluoride ($FeF_3.4\frac{1}{2}H_2O$), filtering the thin slurry obtained on standing into a suspension of magnesium phosphate ($Mg_3(PO_4)_2$) and separating the fresh water obtained from the solid which precipitates on standing.

5. A process for the production of fresh water from sea water which comprises mixing 150 parts by volume of sea water with 22 parts by weight of lead fluoride and 5¼ parts by weight of aluminium fluoride ($AlF_3.7H_2O$), filtering the water from the solid obtained on standing, and adding to the filtrate 5 parts by volume of sea water, allowing the mixture to stand and separating the fresh water obtained from the solid which precipitates on standing.

HANS RUDOLPH FRISCH.